United States Patent [19]
Weman

[11] 3,847,434
[45] Nov. 12, 1974

[54] VEHICLE OCCUPANT RESTRAINT SYSTEM
[75] Inventor: Per Olaf Weman, Haslah, Germany
[73] Assignee: Sigmatex A.G., Basel, Switzerland
[22] Filed: May 2, 1973
[21] Appl. No.: 356,659

[52] U.S. Cl............. 297/389, 280/150 SB, 297/388
[51] Int. Cl......................... A62b 35/02, B60r 21/10
[58] Field of Search........... 297/385, 386, 388, 389; 242/107.4; 380/150 SB

[56] References Cited
UNITED STATES PATENTS

| | | | |
|---|---|---|---|
| 3,147,995 | 9/1964 | Bohlin............................. | 297/385 |
| 3,287,062 | 11/1966 | Board et al........................ | 297/388 |
| 3,348,881 | 10/1967 | Weman.............................. | 297/388 |
| 3,375,994 | 4/1968 | Wohlent et al.................. | 242/107.2 |
| 3,420,573 | 1/1969 | Holmberg.......................... | 297/389 |
| 3,592,507 | 7/1971 | Gilonet............................. | 297/389 |
| 3,741,496 | 6/1973 | Beller.............................. | 242/107.4 |

Primary Examiner—Casmir A. Nunberg
Attorney, Agent, or Firm—Roger H. Criss; Jonathan Plaut

[57] ABSTRACT

This invention provides a vehicle occupant restraint system comprising a retractor adapted to be mounted adjacent the floor of said vehicle and having seat belting attached thereto, means for retracting said seat belting onto said retractor and for permitting said seat belting to be protracted from said retractor and bracket means adapted to be mounted in said vehicle at a location above the level of said retractor and having means therein to allow said seat belting to pass therethrough, said seat belting extending from said retractor through said bracket means and being extendible from said bracket means to a position remote therefrom such that said seat belting is adapted to extend at least across a shoulder of an occupant, said bracket means including locking means movable into a lock position after said seat belting is secured across the shoulder of the occupant to prevent extension of said seat belting from said bracket means and also preferably including means preventing movement of said locking means into said lock position when said seat belting is extended from said bracket means at an acceleration below a predetermined acceleration.

17 Claims, 9 Drawing Figures

PATENTED NOV 12 1974 3,847,434

VEHICLE OCCUPANT RESTRAINT SYSTEM

FIELD OF THE INVENTION

This invention relates to a vehicle safety restraint system.

DISCUSSION OF THE PRIOR ART

Various vehicle safety restraint systems of the seat belt type have been proposed and are presently incorporated into automobiles and the like. Most such restraint systems include a lap belt adapted to be secured around the lower torso of an occupant and a shoulder harness adapted to be secured diagonally across a shoulder of the occupant. It has been proposed to combine the shoulder harness and the lap belt into a single continuous belt, which system is commonly referred to as a three-point system and is shown, for example, in U.S. Pat. No. 3,420,573 to Holmberg. In a three-point system, in general a seat belt retractor is mounted on the floor of the vehicle and has seat belting extending upwards therefrom along the side of the vehicle to a bracket mounted on the ceiling or an upper side portion of the vehicle. The belting passes through the bracket (which is referred to as a run-through bracket) and extends through an adjustable tongue to fixed position which is generally adjacent the retractor. By pulling on the adjustable tongue, sufficient belting is withdrawn from the retractor to extend across the shoulder and lower torso of the occupant to a position adjacent the vehicle seat where the tongue is adapted to releasably lock with a buckle. The retractor itself may be of the emergency locking (inertia) type or the automatic locking type so that the retractor locks when it is desired to prevent extension of the belting.

One problem associated with the above described system is that during an emergency, such as a collision, the force of the occupant moving against the belting causes the belting to elongate to an amount which may be greater than that which prevents contact of the occupant against a forward portion of the vehicle, such as the dashboard.

SUMMARY OF THE INVENTION

In accordance with this invention, a vehicle safety restraint system is provided in which a run-through bracket includes means to lock the belting against extension. As a result, the length of seat belting which is subjected to elongation due to the force of the occupant moving against the belting during an emergency is reduced so that the distance the occupant moves due to elongation of the belting is reduced. In this manner, the forward motion of the occupant due to emergency forces can be arrested in a shorter distance.

More specifically, this invention provides a vehicle occupant restraint system comprising a retractor adapted to be mounted adjacent the floor of said vehicle and having seat belting attached thereto, means for retracting said seat belting onto said retractor and for permitting said seat belting to be protracted from said retractor and bracket means adapted to be mounted in said vehicle at a location above the level of said retractor and having means therein to allow said seat belting to pass therethrough, said seat belting extending from said retractor through said bracket means and being extendible from said bracket means to a position remote therefrom such that said seat belting is adapted to extend at least across a shoulder of an occupant, said bracket means including locking means movable into a lock position after said seat belting is secured across the shoulder of the occupant to prevent extension of said seat belting from said bracket means and also preferably includes means preventing movement of said locking means into said lock position when said seat belting is extended from said bracket means at an acceleration below a predetermined acceleration.

DESCRIPTION OF THE PREFERRED EMBODIMENT

In accordance with a preferred embodiment of this invention and with reference to the drawings, a vehicle restraint system 10 is provided which includes a retractor 12 which has seat belting wound thereon. The term "vehicle" as used herein includes land vehicles, such as automobiles, and airplanes and the like. Also as used herein, the term "seat belting" includes restraint elements of the flat webbing type as well as inflatable band materials such as disclosed in copending U.S. application Ser. No. 290,917 of Donald J. Lewis, filed Sept. 21, 1972, entitled "Vehicle Safety System," and the like. The retractor is mounted adjacent the floor of the vehicle although it may be located at other suitable locations. The term "adjacent the floor of the vehicle" is intended to include the vehicle floor, as well as locations in close proximity thereto such as the side pillar, lower seat portion, etc. The retractor includes a suitable mounting bracket (not shown) to provide for attachment to the vehicle. The retractor includes a spool about which the seat belting is wound and means to permit extension and retraction of the belting. Such means are provided by a conventional coil spring which biases the belting in a retracting direction (i.e., only the spool) but permits the belting to be extended against the spring bias. The retractor may be provided with a locking mechanism which prevents extension of the belting although a locking mechanism need not be present as is further explained below. If the retractor includes a locking mechanism, the retractor may be of the emergency locking or automatic locking type. As is known in the art, an emergency locking retractor is adapted to lock in emergency situations, that is, sudden decelerations, such as in a collision, to prevent extension of the belting. The emergency locking retractor may be of the web-sensitive type which is reponsive to acceleration of the seat belting due to movement of the occupant thereagainst, the vehicle-sensitive type which is responsive to acceleration forces acting upon the vehicle itself or to the relative position of the vehicle, or a combination of both. The automatic locking retractors are designed to automatically lock after a predetermined motion of the seat belting, such as an initial extension from the retractor followed by a partial retraction and a subsequent second extension. An example of such a retractor is shown in U.S. Pat. No. 3,632,055 to Stoffel. As the structure and operation of these retractors are known to those skilled in the art, their details are not specifically described herein.

Figure 4:
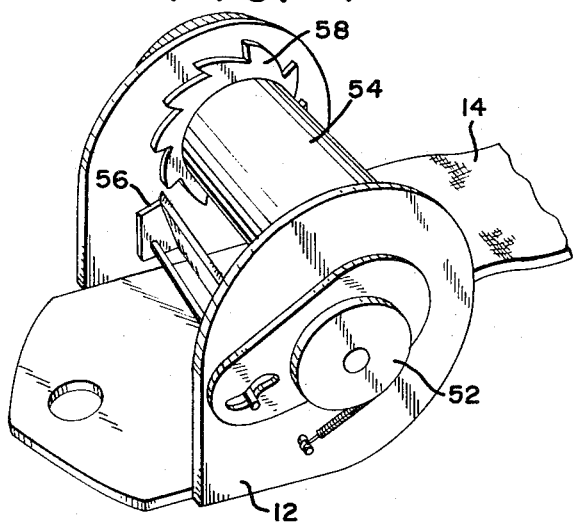
FIG. 4 is a perspective view of one embodiment of a retractor which is part of the restraint system of this invention.

Preferably, retractor 12 is an emergency locking retractor of the web-sensitive type and includes, as is well known, an inertia mass, such as a flywheel, a locking bar adapted to prevent rotation of the retractor in an extending direction and connecting means which are responsive to the rotational lag of the inertia mass at a predetermined acceleration to move the locking bar into locked position. It is to be understood that the connecting means is also responsive at accelerations above the predetermined acceleration and hence the term "at a predetermined acceleration" as used herein includes decelerations above the predetermined accelerations. A retractor of this type is shown in FIG. 4. An example of such a retractor is that disclosed in U.S. Pat. No. 3,741,496 to Beller.

Figure 1:
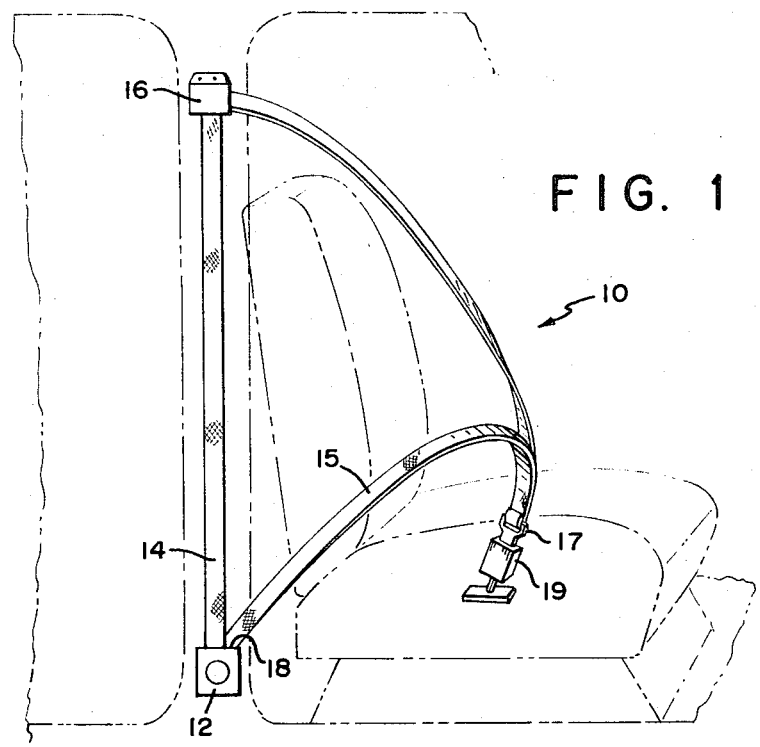
FIG. 1 is a perspective view of the restraint system of this invention.

Seat belting 14 extends upwards from retractor 12 to a bracket means 16 which is shown as being attached to the vehicle side wall although it may be mounted to the ceiling, side pillar or at another location. The seat belting passes through the bracket means and terminates at a location 18 adjacent the retractor where the seat belting is mounted to the floor or the like. Between the floor mount and the bracket means is provided an adjustable, slidable tongue 17 through which the seat belting passes. The tongue includes a locking aperture or slot which is adapted to be cooperatively engaged by the latching mechanism of a buckle 19 located adjacent the seat. The seat is shown in dotted lines in FIG. 1. A section 15 of belting 14 is adapted to pass across the lap of an occupant. It is to be understood that the present invention is not limited to the three-point system described above but may be employed with any shoulder belting and retractor combination.

Figure 2A:
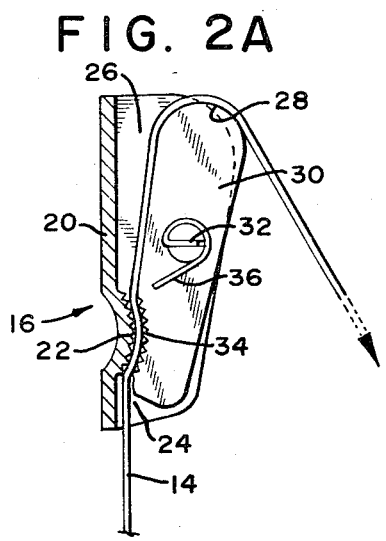
FIG. 2A is a cross-sectional view of one embodiment of the bracket means of this invention, the bracket means being shown in the lock position.

As is shown in FIG. 2A, bracket means 16 includes a base 20 having a locking surface which may be provided with ridges 22. Base 20 has an inlet opening 24 through which seat belting 14 from the retractor enters the bracket means and an outlet opening 26 through which the seat belting exits. The bracket means also includes a cam surface 28 over which the belting passes and a locking means. In one embodiment of this invention, the locking means and cam means are provided by a pivotable lever 30 which is pivotably mounted on a pin 32 which is received by the side walls of the bracket means. At one end of the lever is provided a locking surface 34 which may be provided with ridges and which is movable into abutment with locking surface 22 of the base to pinch seat belting 14 so as to lock the belting against movement. Locking surface 34 of lever 30 is normally held away from the belting and from the locking surface of the base by a spring 36 which is connected to the lever and to the side wall of the bracket means. Other hold away means can be used, such as magnets or the like. At the opposite end of lever 30 is cam surface 28 about which the surface of belting 14 contacts when it is withdrawn and extends from the retractor. Lever 30 is adapted to pivot on pin 32 when the pull of the belting in an extending direction shown by the arrow reaches a predetermined minimum acceleration as is discussed below. Of course, accelerations above the predetermined acceleration will also result in the locking means being moved to its lock position.

Figure 3A:
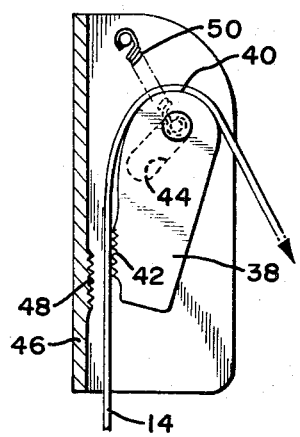
FIG. 3A is a cross-sectional view of another embodiment of the bracket means of this invention, the bracket means being shown in the unlock position.
Figure 3B:
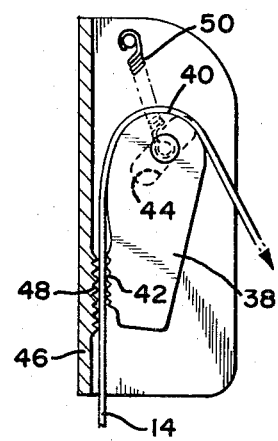
FIG. 3B is similar to FIG. 3A except that the bracket means is in the lock position.

Another embodiment of the bracket means of this invention is shown in FIGS. 3A and 3B. In this embodiment, the cam means and locking means comprise a slidable bar 38 which is movable into locking engagement with seat belting 14. Slidable bar 38 includes a cam surface 40 at one end thereof and a locking surface 42 at the opposite end. The bar has a generally wedge-shaped cross-section with the locking surface being adjacent the narrow end of the wedge. The bar has lateral extensions which are slidably received within slots 44 provided in the side walls of the bracket. The slots extend in a generally downward sloping direction towards the base 46 of the bracket. The base of the bracket is provided with ridges 48 which cooperate with locking surface 42 upon locking of the structure to pinch or press the belting therebetween so that withdrawal of the belting in an extending direction is prevented. Locking surface 42 of bar 38 is held away from belting 14 and from base 46 by a spring 50 attached, for example, between a lateral extension of the bar and the side wall of the bracket. The belting normally bears against cam surface 40 of the bar. The bar is adapted to slide downward and forward in the slots 44 against the spring bias when the pull of the belting against the cam surface reaches a predetermined minimum acceleration as is discussed below. Other arrangements may be utilized to provide the locking means in the bracket as well as the cam means.

Retractor 12 (FIG. 4) is provided with a seat belting movement delay means which operates to retard or prevent further extension of the belting from the retractor. The delay means is preferably actuable at predetermined acceleration of the belting. Alternatively, the delay means may be operable to prevent further extension of the belting from the retractor when the restraint system is secured about an occupant in which case the delay means operates to prevent extension of the belting from the retractor when the acceleration of the belting reaches the predetermined acceleration, as is further explained below. Accordingly, the term "which operates upon extension of the seat belting" includes the situation in which the delay means may or may not be initially actuated but at least becomes actuated upon acceleration of the belting at or above the predetermined amount. Retarding means is preferably provided by an inertia mass, such as an inertia flywheel 52 which is connected to the spool 54 of the retractor and provides the retractor with a moment of inertia. At high acceleration of the belting, the inertia flywheel tends to rotate at a lower angular velocity than the linear velocity of the belting and thus applies a drag force on belting 14 which tends to retard or slow down the rate of extension of the belting from the retractor. Other retarding means may be employed which function to slow the rate of extension of the belting at high acceleration of the belting. The retractor thus need not include a locking function but merely need be provided with retarding means.

It is preferred, however, to include locking means in the retractor. Means which prevent extension of the belting from the retractor preferably include a locking bar 56 which is movable into lock position to arrest rotation of the retractor spool when the belting is subjected to high acceleration forces. A locking bar of this nature may be associated with an inertia mechanism, such as inertia flywheel 52, or a magnetic mechanism. At high acceleration of the belting the inertia mechanism actuates the locking bar which moves into contact with a locking surface, such as ratchet wheel 58, to prevent spool 54 from further rotation in the protracting direction.

As described above, the retractor may be provided with an automatic locking mechanism, as is well known, which locks the retractor against rotation in an extending direction after the seat belting is fastened about the occupant. In this case, the retractor is locked at all times, regardless of the amount of acceleration forces on the belting but the delay means only operates to prevent further extension of the belting from the bracket at high acceleration forces.

Figure 2B:
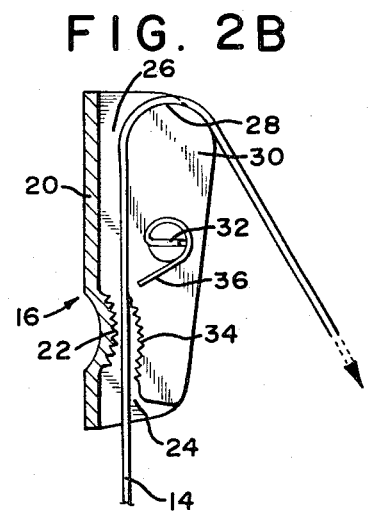
FIG. 2B is similar to FIG. 2A except that the bracket means is in the unlock position.

In operation, the tongue portion 17 is normally resting against the exit opening 26 of bracket 16 or is located between the exit opening and the floor mounting. The locking lever 30 or bar 38 of the bracket is held in its unlock position by means of its corresponding spring. The unlock positions are shown in FIGS. 2B and 3A, respectively. The occupant grasps tongue 17 and pulls the seat belting away from run-through bracket 16 and from the retractor 12 in an extending direction towards buckle 19 to secure the seat belting about him. As the belting is extended from the bracket, it passes over the cam surface (28 or 40) of the bracket. With respect to the FIG. 2A embodiment, the clockwise torque on cam surface 28 generated by the pull of the moving belt surface about the cam and acting to pivot lever 30 to its locked position (FIG. 2A) is insufficient to overcome the counterclockwise torque of spring 36 when belting is extended at an acceleration below a predetermined acceleration. Belting 14 can thus be extended a sufficient distance to lock the tongue in the buckle. Similarly, with respect to the FIG. 3A embodiment, the pulling force of the moving belt surface about cam 40 acting to slide the bar 38 into its locked position (FIG. 3B) is insufficient to overcome the restraining force of spring 50 when the belting is extended from the bracket at an acceleration below the predetermined acceleration. Once the tongue is locked in place within the buckle, the occupant is free to move against the belting so long as the acceleration applied to the belting is below the predetermined amount. The lever or bar of the runthrough bracket remains in its unlock position and the belt moves freely from the retractor and through the run-through bracket. As the occupant moves rearwardly in his seat, the retractor spring takes up the slack in the belting.

If, however, the occupant moves against the belting so that acceleration applied thereto is at or above the predetermined amount, the belting pivots the lever or slides the bar to its locked position so that further movement of the belting from the bracket is prevented. The pivotal motion of lever 30 from its unlock to lock positions occurs because the delay means of the retractor operates to retard or arrest movement of the belting from the retractor in an extending direction and the pulling force of the belting against cam surface 28 of lever 30 in an extending direction is now sufficient to overcome the counterclockwise torque of biasing spring 36. The delay means is actuable in response to the acceleration applied to the belting due to inertia forces or is already operable to prevent extension of the belting from the retractor, as explained previously. Pivoting of lever 30 (FIG. 2A) results in movement of its ribbed surface 34 against the belting to pinch the belt against the ridges 22 of base 20 of the bracket. The belting is thus locked against further extension. Similarly, the sliding motion of bar 38 from its lock to unlock position occurs because the pulling force of the belting is now sufficient to overcome the restraining force of biasing spring 50. This results (FIG. 3B) in movement of the locking surface 42 of bar 38 against the belting to pinch the belting against the ridges 48 of the base of the bracket and prevent further extension of the belting from the bracket.

Accordingly, it can be seen that at high accelerations of the belting, the locking mechanism of the bracket means locks to prevent further extension of the belting. By providing locking of the belting in the bracket means, the length of the belting which is subjected to elongation caused by the force of the occupant moving against the belting in emergency situations is limited to the distance between the bracket means and the tongue which is lockably engaged with the buckle. This is in contrast to the much larger amount of belting which would similarly be subjected to elongation if the bracket means were not provided with a locking feature and the only locking means were located in the retractor. In the latter case, the total distance of the belting between the retractor, the bracket and the locked tongue would be subjected to elongation forces. The present invention thus provides a means of limiting the distance an occupant can move after the restraint system is locked in response to an emergency situation and the occupant is thereby less susceptible to impact against a portion of the vehicle, such as the dash board.

In addition, by providing locking means in the bracket, the retractor need not include a locking mechanism so that the retractor can be lighter in weight and could be formed of plastic rather than metal since the retractor is not subject to locking forces. As such, the retractor can be more economical and need only include a moment of inertia (e.g., inertia wheel) or other retarding means and a retracting spring.

The predetermined acceleration of the seat belting at which the locking means in the bracket locks to prevent further extension of the belting from the bracket is primarily dependent upon the spring rate of the biasing spring, the coefficient of friction between the belting and the cam surface of the cam means and the shape and dimensions of the cam surface. While varying any one of these variables will change the predetermined acceleration needed to lock the belting at the bracket, it is preferred to obtain the desired acceleration for any given design by varying the spring rate. For example, the spring rate can be varied by providing a different set of locations (e.g. openings) at which the spring is attached to the bracket in order to change the torque or biasing force that the spring applies to the lever or bar.

Figure 7:
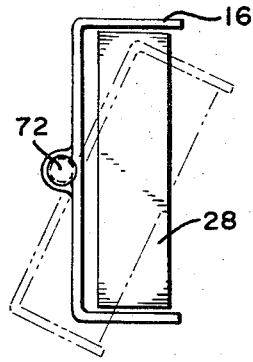
FIG. 7 is a view along line 7—7 of FIG. 5, showing the swivel feature of the bracket means.
Figure 5:
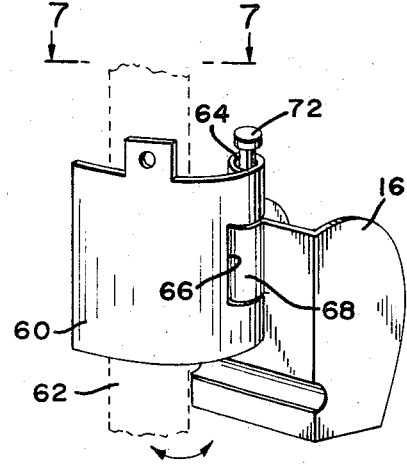
FIG. 5 is a perspective view of the pivotal feature of the bracket means of this invention.
Figure 6:
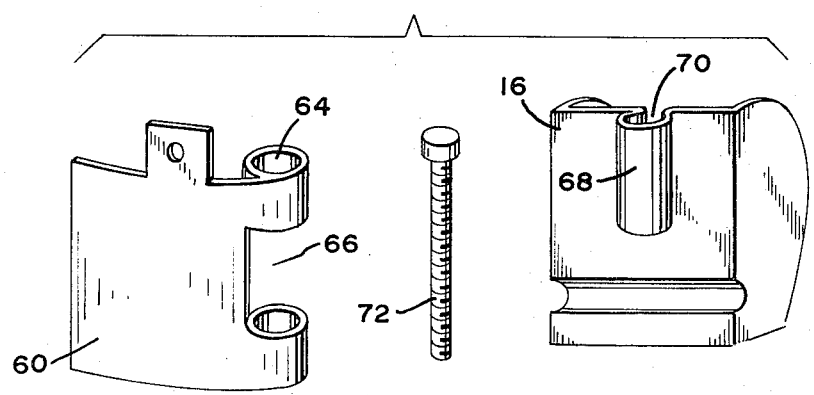
FIG. 6 is an exploded view of the bracket means of FIG. 5.

As stated above, the bracket means is adapted to be pivotably mounted on the side wall, side pillar or ceiling of the vehicle. In accordance with a preferred embodiment of the invention and as is shown in FIGS. 5–7, the bracket is pivotably mounted to the vehicle in a manner which provides a uniform movement of the belting over its cam surface as the belting is extended from the bracket. Preferably the bracket is mounted at a position generally perpendicular to the floor, such as the side wall or pillar of the vehicle. The bracket is pivotable in a plane which intersects and preferably is perpendicular to the plane of the side of the vehicle and parallel to the floor. That is, the bracket is preferably pivotable (as indicated at the arrow in FIG. 5) in a plane which is generally perpendicular to the surface of the support to which the bracket is mounted. This is in contrast to previous run-through brackets which were pivotable only in a direction substantially parallel to the plane of the mounting surface, e.g., side pillar. The present mounting structure minimizes bunching or twisting of the belting at the run-through bracket and maintains the belting which extends between the retractor and the bracket in a generally perpendicular direction that is parallel to the side pillar or wall.

Bracket 16 is provided with a mounting plate 60 which is suitably rigidly secured to the side 62 of the vehicle shown in dotted lines in FIG. 5. One portion of the mounting plate, preferably along one edge thereof, is provided with an opening 64 which extends along the plane of the side of the vehicle. The central portion of the walls of the plate which forms the opening is cut out to provide a location 66 at which a rearwardly extending portion of the base of the bracket can interfit. For this purpose base 20 of bracket 16 is provided with an arcuate rearwardly extending portion 68 which defines an internal opening 70 which is parallel to the opening in the mounting plate. Arcuate portion 68 of the base is interfitted in the cut-out portion 66 of the plate and a pivot pin 72 or the like extends from the upper portion of the mounting plate cavity through the opening in the base and through the lower portion of the plate cavity. The pin is provided with a suitable head to maintain the relative positions of the bracket and the mounting plate. The bracket is thus free to rotate or swivel on the pin in a plane which intersects the plane of the side wall and preferably the motion of the bracket describes an arc in a plane which is generally perpendicular to the plane of side wall and the mounting plate (as shown by the dotted lines of FIG. 7). As a result, there is provided uniform movement of the belting over the cam surface of the bracket without pinching the belting regardless of the position of the bracket when the belting is extended therefrom. In this manner, smooth operation during protraction and retraction of the belting is assured.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. A vehicle occupant restraint system comprising:
   a retractor mounted adjacent the floor of said vehicle and having seat belting attached thereto,
   means for retracting said seat belting onto said retractor and for permitting said seat belting to be protracted from said retractor and
   bracket means mounted against a surface in said vehicle at a location above the level of said retractor and having means therein to allow said seat belting to pass therethrough, said seat belting extending from said retractor through said bracket means and being extendible from said bracket means to a position remote therefrom such that said seat belting is adapted to extend at least across the shoulder of an occupant,
   said bracket means including,
      locking means movable into a lock position to prevent extension of said seat belting from said bracket means after said seat belting is secured across the shoulder of the occupant,
   said bracket means being pivotable in a plane which intersects the plane of said surface.

2. The restraint system of claim 1 wherein said bracket means is pivotable in a plane which is substantially perpendicular to said plane of said surface.

3. The restraint system of claim 2 wherein said surface is a side wall of said vehicle.

4. The restraint system of claim 1 wherein said bracket means includes a base having an outwardly extending portion which defines an internal opening, a mounting plate mounted against said surface in said vehicle, said mounting plate having an opening therein which interfits with said extending portion of said base, and a securing means extending through said opening of said mounting plate and said internal opening to allow pivotable motion of said bracket means with respect to said plate.

5. The restraint system of claim 1 wherein a tongue is provided on said seat belting which extends through said bracket means, said seat belting extends through said tongue and is adapted to be secured to the floor of said vehicle, and said tongue is adapted to lockably engage with a buckle provided adjacent a seat in said vehicle.

6. The restraint system of claim 5 wherein said tongue normally rests against said bracket means and is slidable on said seat belting.

7. A vehicle occupant restraint system comprising:
   a retractor mounted adjacent the floor of said vehicle and having seat belting attached thereto,
   means for retracting said seat belting onto said retractor and for permitting said seat belting to be protracted from said retractor,
   bracket means mounted in said vehicle at a location above the level of said retractor and having means therein to allow said seat belting to pass therethrough, said seat belting extending from said retractor through said bracket means and being extendible from said bracket means to a position remote therefrom such that said seat belting is adapted to extend at least across the shoulder of an occupant,
   said bracket means including,
      locking means movable into a lock position to prevent extension of said seat belting from said bracket means after said seat belting is secured across the shoulder of the occupant,
   and seat belt movement delay means provided in said retractor which operates upon extension of said seat belting from said bracket means at a predetermined acceleration to retard or prevent further extension of said seat belting from said retractor, said locking means being movable into said lock position at said predetermined acceleration upon operation of said delay means.

8. The restraint system of claim 7 including means preventing movement of said locking means into said lock position when said seat belting is extended from said bracket means at an acceleration below said predetermined acceleration.

9. The restraint system of claim 8 including cam means in said bracket means, said cam means having a surface engageable by said seat belting as said seat belting is extended from said bracket means, said cam means being pulled by said seat belting at said predetermined acceleration in a direction to move said locking means into its lock position.

10. The restraint system of claim 8 wherein said locking means includes a surface which engages said seat belting when said locking means is in said lock position.

11. The restraint system of claim 9 wherein said bracket means includes a pivotally mounted lever, said cam means being provided on one end of said lever and said locking means being provided on an opposite end of said lever.

12. The restraint system of claim 9 wherein said bracket means includes a slidably mounted bar, said cam means being provided on one end of said bar and said locking means being provided on an opposite end of said bar.

13. The restraint system of claim 8 wherein said means preventing movement of said locking means comprises a spring which biases said locking means away from its lock position.

14. The restraint system of claim 8 wherein said seat belting movement delay means comprises an inertia mass which retards extension of said seat belting from said retractor.

15. The restraint system of claim 14 wherein said inertia mass comprises an inertia wheel operatively associated with a spool provided in said retractor upon which said seat belting is wound, said wheel rotating with said spool at accelerations of said seat belting below said predetermined acceleration but lagging behind said spool at said predetermined acceleration to retard extension of said seat belting from said retractor.

16. The restraint system of claim 8 wherein said seat belting movement delay means operates to prevent extension of said seat belting from said retractor and includes means to lock a spool upon which said seat belting is wound from rotation in a protracting direction when said seat belting is extended at said predetermined acceleration.

17. The restraint system of claim 8 wherein said seat belting movement delay means comprises lock means in said retractor which prevents extension of said seat belting from said retractor after said seat belting is secured across the shoulder of the occupant.

* * * * *